(12) United States Patent
Wright

(10) Patent No.: US 11,533,902 B2
(45) Date of Patent: Dec. 27, 2022

(54) SYSTEM FOR ERADICATING FIRE ANTS AND OTHER INSECTS

(71) Applicant: Mark T. Wright, Prospect, KY (US)

(72) Inventor: Mark T. Wright, Prospect, KY (US)

(*) Notice: Subject to any disclaimer, the term of this patent is extended or adjusted under 35 U.S.C. 154(b) by 76 days.

(21) Appl. No.: 17/071,232

(22) Filed: Oct. 15, 2020

(65) Prior Publication Data
US 2022/0117208 A1 Apr. 21, 2022

(51) Int. Cl.
*A01M 17/00* (2006.01)

(52) U.S. Cl.
CPC ..... *A01M 17/002* (2013.01); *A01M 2200/011* (2013.01)

(58) Field of Classification Search
USPC .......................................... 43/129, 130, 144
See application file for complete search history.

(56) References Cited

U.S. PATENT DOCUMENTS

| | | | | |
|---|---|---|---|---|
| 157,559 A * | 12/1874 | Waterbury | ............... | E01C 23/14 |
| | | | | 126/271.2 A |
| 1,309,193 A * | 7/1919 | Garrison | ............. | A01M 1/2066 |
| | | | | 43/127 |
| 1,415,491 A * | 5/1922 | Souther | ................. | A01M 15/00 |
| | | | | 126/271.2 A |
| 1,562,902 A * | 11/1925 | Metzger | ................ | A01M 13/00 |
| | | | | 43/129 |
| 1,567,969 A * | 12/1925 | Marek | ................... | A01M 13/00 |
| | | | | 43/132.1 |
| 1,614,015 A * | 1/1927 | Neuls | ................... | A01M 13/003 |
| | | | | 43/125 |
| 1,642,779 A * | 9/1927 | Kilbourne | ............. | A01M 13/00 |
| | | | | 222/282 |
| 1,723,955 A * | 8/1929 | Shepherd | ............... | A01M 13/00 |
| | | | | 422/306 |
| 1,727,995 A * | 9/1929 | Lechler | ...................... | A61L 2/20 |
| | | | | 43/130 |
| 1,921,901 A * | 8/1933 | Anderson | ............. | A01M 15/00 |
| | | | | 431/329 |
| 2,117,419 A * | 5/1938 | Hamrick | ............. | A01M 1/2094 |
| | | | | 219/385 |

(Continued)

OTHER PUBLICATIONS

Eradicating fire ants with hot water (https://tt.research.ucf.edu/eradicating-fire-ants-with-hot-water/). Published May 4, 2016.

*Primary Examiner* — Peter M Poon
*Assistant Examiner* — Morgan T Jordan
(74) *Attorney, Agent, or Firm* — Dinsmore & Shohl LLP

(57) ABSTRACT

A system for exterminating insects includes a housing, a fluid-heating assembly housed within the housing that includes one or more fuel reserves, one or more burners that receive fuel from the one or more fuel reserves, and a heat exchanger defining a sinuous flow path positioned to receive heat from the one or more burners, a fluid inlet line coupled to the housing and fluidly connectable to a residential hose bib, the fluid inlet line fluidly coupled to the sinuous flow path of the heat exchanger, such that fluid is directed from the fluid inlet line directly to the sinuous flow path of the heat exchanger, and a fluid outlet line coupled to the housing and fluidly coupled to the sinuous flow path of the heat exchanger such that fluid is directed from the sinuous flow path of the heat exchanger directly through the fluid outlet line.

11 Claims, 4 Drawing Sheets

(56) References Cited

U.S. PATENT DOCUMENTS

| | | | | |
|---|---|---|---|---|
| 2,168,099 A * | 8/1939 | Hawkins | A01M 17/002 | 43/130 |
| 2,242,789 A * | 5/1941 | McFee | A01G 29/00 | 239/271 |
| 2,319,459 A * | 5/1943 | Johnson | B05B 7/24 | 239/137 |
| 2,402,402 A * | 6/1946 | Hickman | F41H 9/06 | 422/305 |
| 2,548,065 A * | 4/1951 | Reister | A01M 15/00 | 47/1.01 R |
| 2,576,976 A * | 12/1951 | Stagner | A01M 1/2077 | 137/513.5 |
| 2,607,743 A * | 8/1952 | Hession, Jr. | F41H 9/06 | 516/2 |
| 2,881,755 A * | 4/1959 | Diehl | A61H 33/063 | 392/404 |
| 2,906,056 A * | 9/1959 | Youngblood | A01M 7/0092 | 43/124 |
| 3,071,200 A * | 1/1963 | Kuhl | A01M 17/002 | 175/207 |
| 3,166,034 A * | 1/1965 | Haroldson | A01G 29/00 | 111/7.3 |
| 3,214,860 A * | 11/1965 | Johnson | B65D 83/72 | 43/129 |
| 3,242,098 A * | 3/1966 | Andrews | A01M 13/00 | 239/138 |
| 3,326,306 A * | 6/1967 | Weir | A01G 29/00 | 175/207 |
| 3,458,948 A * | 8/1969 | Schlensker | B05B 9/0861 | 392/405 |
| 3,548,532 A * | 12/1970 | Landwer | A01M 1/2088 | 43/129 |
| 3,982,351 A * | 9/1976 | Waldron | A01M 13/00 | 43/129 |
| 4,349,723 A * | 9/1982 | Swiatosz | F41H 9/06 | 392/399 |
| 4,637,161 A * | 1/1987 | Turner | A01M 19/00 | 43/132.1 |
| 4,756,118 A * | 7/1988 | Evans, II | A01M 1/2094 | 43/132.1 |
| 5,031,355 A * | 7/1991 | Ryan | A01M 19/00 | 43/130 |
| 5,109,629 A * | 5/1992 | King, Jr | A01M 17/002 | 239/289 |
| 5,319,878 A * | 6/1994 | Moffett | A01M 1/2094 | 43/132.1 |
| 5,501,032 A * | 3/1996 | Pitman | A01M 13/00 | 43/132.1 |
| 5,548,921 A * | 8/1996 | Kleisath | A01M 25/006 | 43/124 |
| 5,870,852 A * | 2/1999 | Stanley | A01M 19/00 | 43/132.1 |
| 5,881,493 A * | 3/1999 | Restive | B05B 7/2416 | 43/132.1 |
| 6,026,609 A | 2/2000 | Rawls | | |
| 6,029,589 A * | 2/2000 | Simpson | A01M 21/04 | 111/7.2 |
| 6,079,149 A * | 6/2000 | Hastings | A01M 17/002 | 43/132.1 |
| 6,182,586 B1 * | 2/2001 | Hunt | A01C 23/023 | 405/263 |
| 6,247,265 B1 * | 6/2001 | Maze | A01M 17/002 | 43/124 |
| 6,394,009 B1 * | 5/2002 | Yonat | A01G 11/00 | 110/341 |
| 6,966,145 B1 * | 11/2005 | Taft | A01M 17/002 | 43/132.1 |
| 7,752,802 B2 | 7/2010 | McDonald | | |
| 7,766,722 B2 * | 8/2010 | Arndt | A01K 51/00 | 449/2 |
| 7,797,878 B2 | 9/2010 | Schuster | | |
| 8,529,248 B2 * | 9/2013 | Clement | F23D 14/465 | 43/144 |
| 2001/0054248 A1 * | 12/2001 | Neumann | A01N 65/38 | 43/132.1 |
| 2002/0078621 A1 * | 6/2002 | Jones | A01M 1/2038 | 43/124 |
| 2006/0081723 A1 * | 4/2006 | Turberville | B05B 7/262 | 239/129 |
| 2006/0188241 A1 | 8/2006 | Higham et al. | | |
| 2007/0056209 A1 * | 3/2007 | Schuster | A01M 3/007 | 43/132.1 |
| 2007/0084105 A1 * | 4/2007 | Lindsay | A01M 1/2094 | 43/132.1 |
| 2007/0137095 A1 * | 6/2007 | Chen | A01M 1/2094 | 43/132.1 |
| 2009/0290938 A1 * | 11/2009 | Asaoka | B09C 1/08 | 405/128.45 |
| 2009/0293343 A1 * | 12/2009 | McDonald | A01M 3/007 | 43/130 |
| 2010/0129157 A1 * | 5/2010 | Reddy | B09C 1/06 | 422/26 |
| 2011/0289823 A1 * | 12/2011 | Alford | A01M 7/0046 | 43/124 |
| 2012/0066961 A1 * | 3/2012 | Schuster | A01M 1/2094 | 43/132.1 |
| 2012/0102819 A1 * | 5/2012 | Nelsen | A01M 3/007 | 43/130 |
| 2012/0227314 A1 | 9/2012 | Lo | | |
| 2013/0180439 A1 * | 7/2013 | Cink | A01C 23/028 | 111/127 |
| 2014/0325894 A1 * | 11/2014 | Dentone | A01M 17/002 | 285/272 |
| 2015/0113856 A1 * | 4/2015 | Kawashima | A01M 17/00 | 43/132.1 |
| 2015/0296751 A1 * | 10/2015 | Arndt | A01M 1/2088 | 43/130 |
| 2016/0120165 A1 * | 5/2016 | Leach | F22B 1/284 | 43/130 |
| 2016/0120166 A1 * | 5/2016 | Kim | A01M 17/002 | 43/130 |
| 2016/0192578 A1 * | 7/2016 | Cink | A01M 25/006 | 111/7.1 |
| 2016/0198695 A1 * | 7/2016 | Cink | A01C 23/026 | 111/7.1 |
| 2016/0286745 A1 * | 10/2016 | Riffe | A01G 29/00 | |
| 2016/0338336 A1 * | 11/2016 | Aylett | A01M 17/002 | |
| 2016/0345572 A1 | 12/2016 | King | | |
| 2017/0290324 A1 * | 10/2017 | Rocha | A01M 21/04 | |
| 2018/0243786 A1 * | 8/2018 | Spence | B05C 11/1039 | |

* cited by examiner

SYSTEM FOR ERADICATING FIRE ANTS AND OTHER INSECTS

TECHNICAL FIELD

The present specification generally relates to pest control systems and, more specifically, to systems for eradicating fire ants using water at an elevated temperature.

BACKGROUND

Fire ants are an invasive species of insect that account for millions of dollars in property damage annually and injury to humans and domesticated livestock (e.g., cattle). Present systems for eradicating fire ants are insufficient for treating areas surrounding residential properties due to size and/or operating requirements. Furthermore, the use of pesticides in extermination of pests may lead to contamination of soil and or ground water. Accordingly, embodiments of the present disclosure are directed to portable systems for fire ant and/or other insect extermination systems which may be used on and/or around residential properties. Such systems may be used without pesticides thereby providing a more environmentally friendly extermination system.

SUMMARY

In one embodiment, a system for exterminating insects includes a housing, a fluid-heating assembly housed within the housing that includes one or more fuel reserves, one or more burners that receive fuel from the one or more fuel reserves, and a heat exchanger defining a sinuous flow path positioned to receive heat from the one or more burners, a fluid inlet line coupled to the housing and fluidly connectable to a residential hose bib, the fluid inlet line being fluidly coupled to the sinuous flow path of the heat exchanger, such that fluid is directed from the fluid inlet line directly to the sinuous flow path of the heat exchanger, and a fluid outlet line coupled to the housing and fluidly coupled to the sinuous flow path of the heat exchanger such that fluid is directed from the sinuous flow path of the heat exchanger directly through the fluid outlet line. Fluid within the heat exchanger is heated to an extermination temperature.

In another embodiment, an application stem for a system for exterminating ants, the application stem includes a modular hollow shaft comprising a first end and a second end and defining one or more perforations adjacent the second end and modular tip receiver opening formed at the second end, a mount for fluidly coupling the modular hollow shaft to a heat exchanger of the system for exterminating fire ants, a modular tip receiver positioned within the modular tip receiver opening, and a modular tip removably coupled to the modular tip receiver, wherein fluid heated within the heat exchanger is supplied with fluid from the heat exchanger through the fluid outlet line, and the fluid exits the application stem through the one or more perforations.

In yet another embodiment, a system for exterminating insects includes a housing mounted to a chassis including one or more wheels that are rotatably coupled to the chassis, a fluid-heating assembly housed within the housing and including one or more fuel reserves, one or more burners that receive fuel from the one or more fuel reserves, and a heat exchanger defining a sinuous flow path positioned above the one or more burners to receive heat from the one or more burners, a fluid inlet line coupled to the housing and configured to be directly fluidly coupled to a residential hose bib, the fluid inlet line being fluidly coupled to the sinuous flow path of the heat exchanger, such that fluid is directed from the fluid inlet line directly to the sinuous flow path of the heat exchanger, and a fluid outlet line coupled to the housing and fluidly coupled to the sinuous flow path of the heat exchanger such that fluid is directed from the sinuous flow path of the heat exchanger directly through the fluid outlet line. Fluid within the heat exchanger is heated to an extermination temperature.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
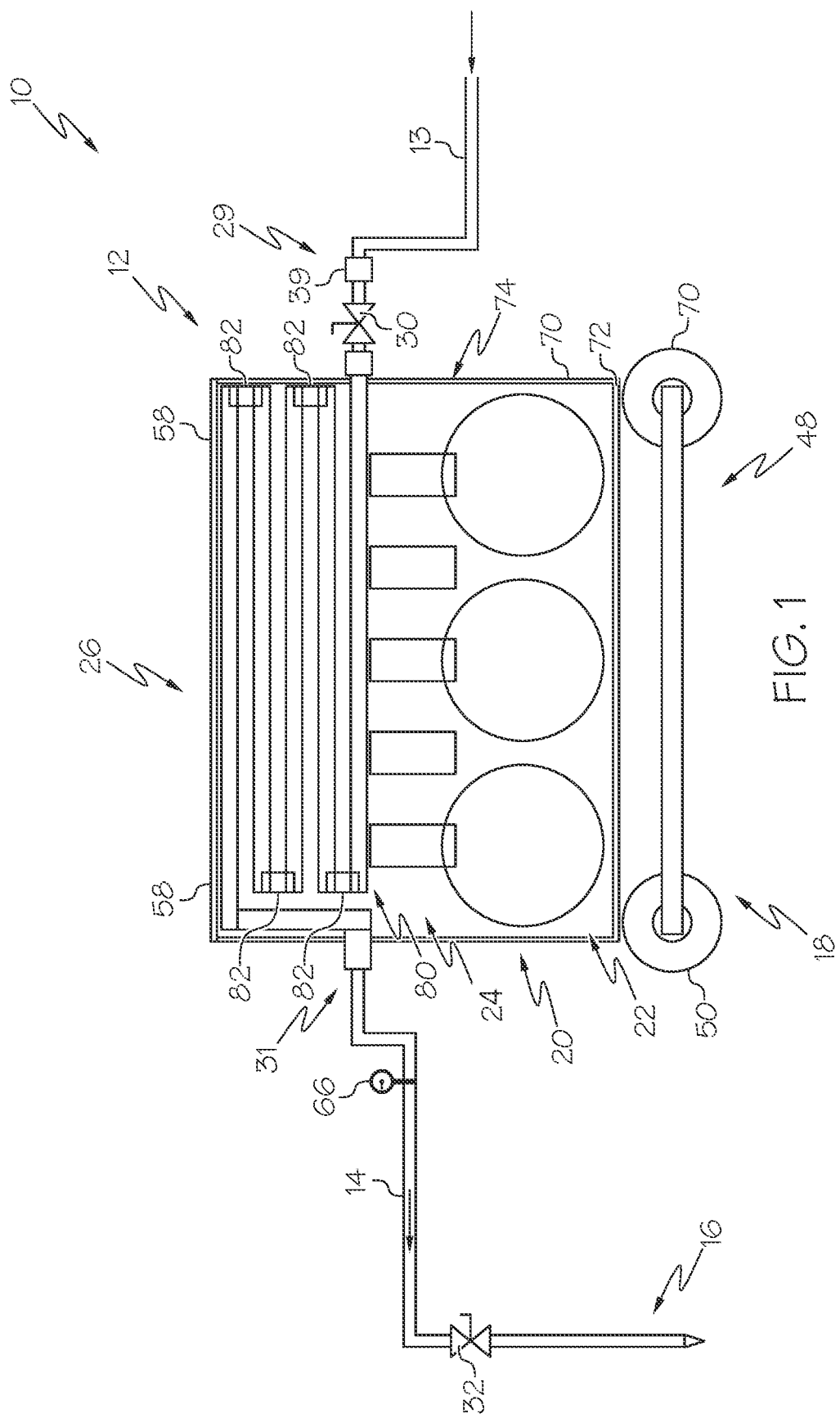
FIG. 1 schematically depicts a system for exterminating insects, according to one or more embodiments shown and described herein.

FIG. 1 schematically depicts an embodiment of a system for exterminating insects. The system generally includes a housing, a fluid-heating assembly housed within the housing that includes one or more fuel reserves, one or more burners receiving fuel from the one or more fuel reserves, and a heat exchanger defining a sinuous flow path. A fluid inlet line of the system may be coupled to the housing and configured to be directly fluidly coupled to a residential hose bib. The fluid inlet line is fluidly coupled to the sinuous flow path of the heat exchanger, such that fluid is directed from the fluid inlet line directly to the sinuous flow path of the heat exchanger. A fluid outlet line of the system may be coupled to the housing and fluidly coupled to the sinuous flow path of the heat exchanger such that fluid is directed from the sinuous flow path of the heat exchanger directly through the fluid outlet line, wherein fluid within the heat exchanger is heated to a temperature sufficient to exterminate insects. The system may provide a convenient means for eradicating insects using the heated fluid and may be generally usable and transportable by an individual without the need for any external mechanisms or vehicles for moving the system. Moreover, the system may be directly coupled to a residential hose bib such that a tank or other vessel for transporting large amounts of water is not needed, which may substantially reduce the weight of the system compared to a system including a tank and make the system more portable over uneven terrain. Various embodiments of the system for exterminating insects and the operation thereof will be described in greater detail herein.

Referring now to FIG. 1, an embodiment of a system 10 for exterminating insects is shown. The system 10 may generally include a housing 12, a fluid inlet port 29, a fluid outlet port 31, a fluid inlet line 13, a fluid-heating assembly 20, a fluid outlet line 14, an application stem 16, and a support cart 18. A greater or fewer number of components are contemplated without departing from the scope of the present disclosure. As will be described in greater detail herein, the system 10 may heat fluid traveling through the system 10 to an extermination temperature. As used herein the term "extermination temperature" may refer to any temperature sufficient to exterminate an insect. For example, an extermination temperature may be near-boiling and/or above a boiling temperature of the fluid traveling through the system 10. In some embodiments, an extermination temperature may include any temperature above about 150 degrees F., such as between 150 degrees F. to about 220 degrees F., or higher. In some embodiments, the extermination temperature may be between about 170 to about 220 degrees F., e.g., about 180 and about 210 degrees F., about 190 and about 200 degrees F., etc. In some embodiments, the system 10 may deliver super-heated steam. In such embodiments, the components of the system 10 would be sufficiently robust to contain and deliver super-heated steam.

The heated fluid may then flow through the application stem 16, for example, to exterminate insects. In embodiments, the application stem 16 may be inserted into, for example, an ants' nest, to inject the heated fluid through the tunnels of the ants next. The components of the embodiments of the system 10 and their operation will be described in greater detail herein.

It is noted that "fluid" as used herein may include any liquid, steam, gas, or combination thereof that may be used for extermination of insects. Some fluids, such as water, which may not have chemical additives so as not to contaminate local soil or ground water. However, other fluids are contemplated and possible, including fluids having any suitable chemical additives which may be heated prior to application. Such chemical additives may include substances useful in destroying insects or other organisms.

The housing 12 may include any structure sized and shaped to house one or more components of the system 10. For example, the housing 12 generally has a volume sufficient to house and support the components of the fluid-heating assembly 20. In some embodiments, additional volume within the housing 12 may be used to store the fluid inlet line 13, the fluid outlet line 14, and/or the application stem 16. However, it is noted that in various embodiments, hooks, mounts, brackets, or the like may be coupled to an exterior surface of the housing 12 to which one or more components, such as the fluid inlet line 13, the fluid outlet line 14, and/or the application stem 16 may be removably mounted. The housing may include one or more sidewalls 70, a top wall 58, and a base wall 72 that define an enclosed volume 74 within the housing 12.

The housing 12 may be supported by and/or mounted to the support cart 18 and may be moveable therewith as described in greater detail herein. In some embodiments, the support cart 18 may provide the base wall 72 of the housing 12. The housing 12 may have one or more panels which may be opened and/or closed for access to the enclosed volume 74 of the housing 12. For example, one or more doors may be formed within the one or more sidewalls 70 which may be opened for access to the one or more fuel reserves 22. In some embodiments, the top wall 58 or a portion thereof may be movably coupled to the one or more sidewalls 70 of the housing 12 and permit access to the components contained therein. The top wall 58 may be movably coupled to the housing 12 using one or more hinges, clasps, fasteners, or the like (not depicted). Moving of the top wall 58 between a closed position and an open position may permit inspection, isolation, and/or replacement of various components of the system 10.

The fluid inlet port 29 may be mounted to the housing 12. For example, the fluid inlet port 29 may be mounted to the base wall 72 of the housing 12. The fluid inlet port 29 may be coupled to a fluid inlet line 13 (e.g., a hose) to fluidly couple the fluid inlet line 13 to the heat exchanger 26. For example, the fluid inlet port 29 may include a fitting (e.g., a pipe fitting, a hose fitting, etc.) and be rated to receive fluid from a civil source (e.g., municipal water system) or a fluid reservoir (e.g., a water tank, etc.) that is remote from the housing 12 such as via the fluid inlet line 13. That is, the fluid inlet port 29 may be rated to receive water at a specific pressure and temperature. For example, the fluid inlet port 29 may generally be rated to receive fluid at about 30 psi to about 60 psi and ground temperature. Accordingly, the fluid inlet port 29 and the system 10 may be hooked directly to a residential hose bib, instead of needing a fluid reservoir that must be moved with the system 10. This provides for greater flexibility for using the system 10 on residential properties at positions that may not otherwise be unreachable via vehicle mounted systems having large fluid reservoirs.

It is noted that in embodiments, wherein the fluid inlet port 29 is connected to a fluid reservoir such as a water tank, a pump, not shown may be included to cause fluid to flow from the water tank to the fluid inlet port 29 at a desired pressure (e.g., between about 30 psi to about 60 psi. The pump may for part of the system 10 or may be part of the water tank.

In embodiments, the fluid inlet port 29 may include a pressure regulating valve 30. The pressure regulating valve 30 may be a pressure reducing valve that reduces a pressure of fluid flowing through the fluid inlet line 13 prior to entering the heat exchanger 26 to maintain a pressure in the heat exchanger 26. For example, the pressure regulating valve 30 may regulate incoming fluid pressure to be between about 30 psi to about 60 psi, which may prevent over pressurization of the heat exchanger 26.

A fluid outlet port 31 may be mounted to the housing 12. For example, the fluid outlet port 31 may be mounted to the housing 12 on a sidewall 70 opposite the fluid inlet port 29. However, in other embodiments, the fluid outlet port 31 may be arranged along the same sidewall 70 or sidewall 70 from the fluid inlet port 29. The fluid outlet port 31 may be coupled to the fluid outlet line 14 via a fitting (e.g., a house fitting or the like) that fluidly couples the fluid outlet port 31 to the fluid outlet line 14. The fluid outlet port 31 may be fluidly coupled to the heat exchanger 26 such that heated fluid flow directly from the heat exchanger 26 through the fluid outlet port 31 for downstream application.

Still referring to FIG. 1, the fluid-heating assembly 20 may include one or more fuel reserves 22, one or more burners 24, and a heat exchanger 26. The one or more fuel reserves 22 may be any type of fuel capable of burning to generate heat. For example, the fuel reserves 22 may be propane gas contained in commercially-available propane tanks. Any number of one or more fuel reserves 22 are contemplated and possible, such as two or more fuel reserves, three or more fuel reserves, etc. In such examples, the one or more fuel reserves may be replaceably positioned within the housing 12 for convenient replacement or removal due to depletion of fuel in the one or more fuel reserves 22.

Positioned above the one or more fuel reserves 22 may be the one or more burners 24. The one or more burners 24 are operably coupled (e.g., fluidly coupled via one or more fuel lines) to the one or more fuel reserves 22 to receive fuel from the one or more fuel reserves for producing heat via burning fuel from the one or more fuel reserves 22. In embodiments, the one or more burners 24 may include a plurality of burners arranged within an array, e.g., two or more burners, three or more burners, four or more burners, five or more burners, etc. The burners may be arranged beneath the heat exchanger 26 such that heat produced by the one or more burners 24 heats the heat exchanger 26 thereby heating fluid flowing within the heat exchanger 26. The one or more burners 24 may be individually adjustable to increase or decrease the intensity of their associated flame. In other embodiments, the burners 24 may be operated as a group or groups.

The heat exchanger 26 may be fluidly coupled to the fluid inlet port 29 and the fluid outlet port 31 such fluid upon entering the fluid inlet port 29 flows through the heat exchanger 26 and exits the heat exchanger 26 at the fluid outlet port 31. The heat exchanger 26 any type of heat exchanger 26 suitable for direct exposure to flame having any combination of heat transfer features (e.g., parallel flow, counter flow, u-tube, single pass, multi-pass, plate-and-frame, microchannel, finned/unfinned, etc.). For example, the heat exchanger 26 may define a sinuous flow path 80 positioned over the one or more burners 24. The sinuous flow path 80 may define one or more turns 82 (e.g., two or more turns, five or more turns, six or more turns, etc.). Such that fluid is routed through the heat exchanger 26 so as to pass above the one or more burners 24 a plurality of times (e.g., two or more times, five or more times, six or more times, etc.). The sinuous flow path 80 may be stacked in the vertical direction as depicted in FIG. 1, or the sinuous flow path 80 may be horizontally disposed in a single layer as depicted in FIG. 3.

The heat exchanger 26 in conjunction with the burners 24 and the fuel reserves 22 may be configured to impart sufficient heat to the fluid to heat the fluid to the extermination temperature, described above. For example, if water is used as the fluid within the system 10, the heat exchanger 26 may boil the water and create saturated steam or superheated steam. In some embodiments, the heat exchanger 26 may be configured to withstand the increased pressure associated with a fluid flashing to a vapor (i.e., boiling). For example, in embodiments that use water as the heated fluid, the heat exchanger 26 and other components of the system 10 may be configured to withstand the pressure increase as the water boils in the heat exchanger 26.

In some embodiments, and as noted above, the system 10 may include a pump or other device for increasing the pressure of the fluid entering the system 10. For example, the system 10 may include a pump (not depicted) fluidly coupled to the system 10 at the fluid inlet port 29 or the fluid outlet port 31 of the heat exchanger 26. The pump may increase the pressure of the fluid in the system 10 such that the fluid exits the system through the application stem 16 at a higher pressure, thereby increasing an effective distance that fluid can be applied using the application stem 16 as described in greater detail herein. In some embodiments, the pump may be powered by an on-board power supply (not depicted), such as a battery bank, or may be configured to receive electrical power via an electrical wire (not depicted) from a publicly available power source, such as a standard 110 V AC outlet.

Figure 3:
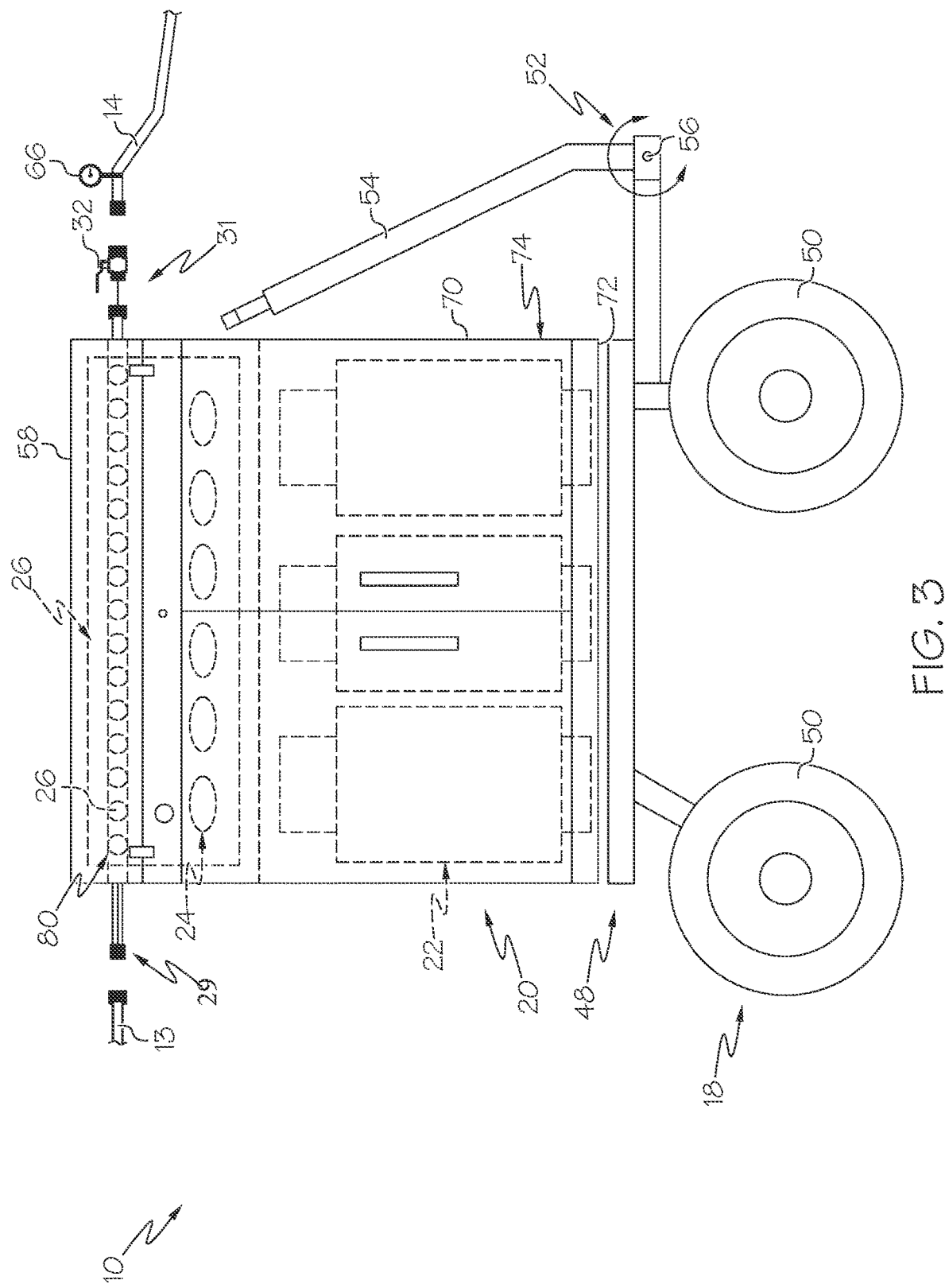
FIG. 3 schematically depicts a system for exterminating insects, according to one or more embodiments shown and described herein.

Referring to FIGS. 1 and 3, the support cart 18 may provide a support for supporting and/or moving one or more components of the system 10. The support cart 18 may include a chassis 48 that may include one or more wheels 50 that may include, for example, pneumatic tires. In the depicted embodiment, the system 10 includes four wheels 50, but embodiments may have fewer or more wheels (e.g., 3, 5, 6, etc.). As illustrated in FIG. 3, the support cart 18 may further include a steering mechanism 52 that may steer one or more of the wheels 50. The steering mechanism 52 may include an adjustable handle 54 that may adjust based on characteristics of the user. For example, as shown in FIG. 3, the adjustable handle 54 may pivot at a joint 56 to change a height of a handle to make it convenient for an individual to pull the system 10 from one place to another to apply the application stem 16 to eradicate insects. In some embodiments, the adjustable handle 54 may be used to turn one or more of the wheels 50 to steer the chassis 48.

The fluid inlet line 13 may be coupled to the fluid inlet port 29, via a fitting 39 such as a hose fitting. The fluid inlet line 13 may be a hose (e.g., a rubber garden-type hose) or similar conduit which may be connected to a fluid source, such as a residential hose bib. In other embodiments, it is contemplated that the fluid inlet line 13 may be connected to other types of fluid sources such as contained fluid reservoirs, wells, or the like. The fluid inlet line 13 may be flexible such that the housing 12 and components contained therein may be moved relative to the fluid source to deliver heated fluid to locations displaced from the fluid source. For example, the distance at which the housing 12 may be moved from the fluid source may only be limited by the length of the fluid inlet line 13, which may be adjusted or replaced based on the needs of the user. For example, for larger properties, a longer fluid inlet line 13 may be used versus a smaller property.

Referring to FIG. 1, the fluid outlet line 14 may be coupled to the fluid outlet port 31 and may generally be a flexible, hollow conduit that may fluidly couple the fluid outlet port 31 to an application stem inlet 34 of the application stem 16. The inlet and outlet of the fluid outlet line 14 may include male and or female threaded connections capable of removably coupling the fluid outlet line 14 to the housing 12 and the application stem 16. The fluid outlet line 14 may be any conduit rated to hold heated water in the range of about 170 to about 220 degrees F., e.g., about 180 and about 210 degrees F., about 190 and about 200 degrees F., etc. The fluid outlet line 14 may be, for example, a heavy duty, flexible rubber hose. In embodiments, the fluid outlet line 14 may include insulation to prevent the dissipation of heat before application of the heated fluid with the application stem 16 or to permit a user of the system 10 to hold the fluid outlet line 14 while heated fluid is passing through the fluid outlet line 14. As noted above, the fluid outlet line 14 may be bendable or flexible such that a user can move the application stem 16 with respect to the housing 12 to apply the application stem 16 as described in greater detail herein. In some embodiments, the fluid outlet line 14 may include a temperature and/or pressure gauge, such as the gauge 66 for convenient determination of a temperature and/or a pressure within the fluid outlet line 14 (i.e., at the outlet of the heat exchanger 26). In embodiments, the fluid outlet line 14 may be shorter in length than the fluid inlet line 13.

Figure 2A:
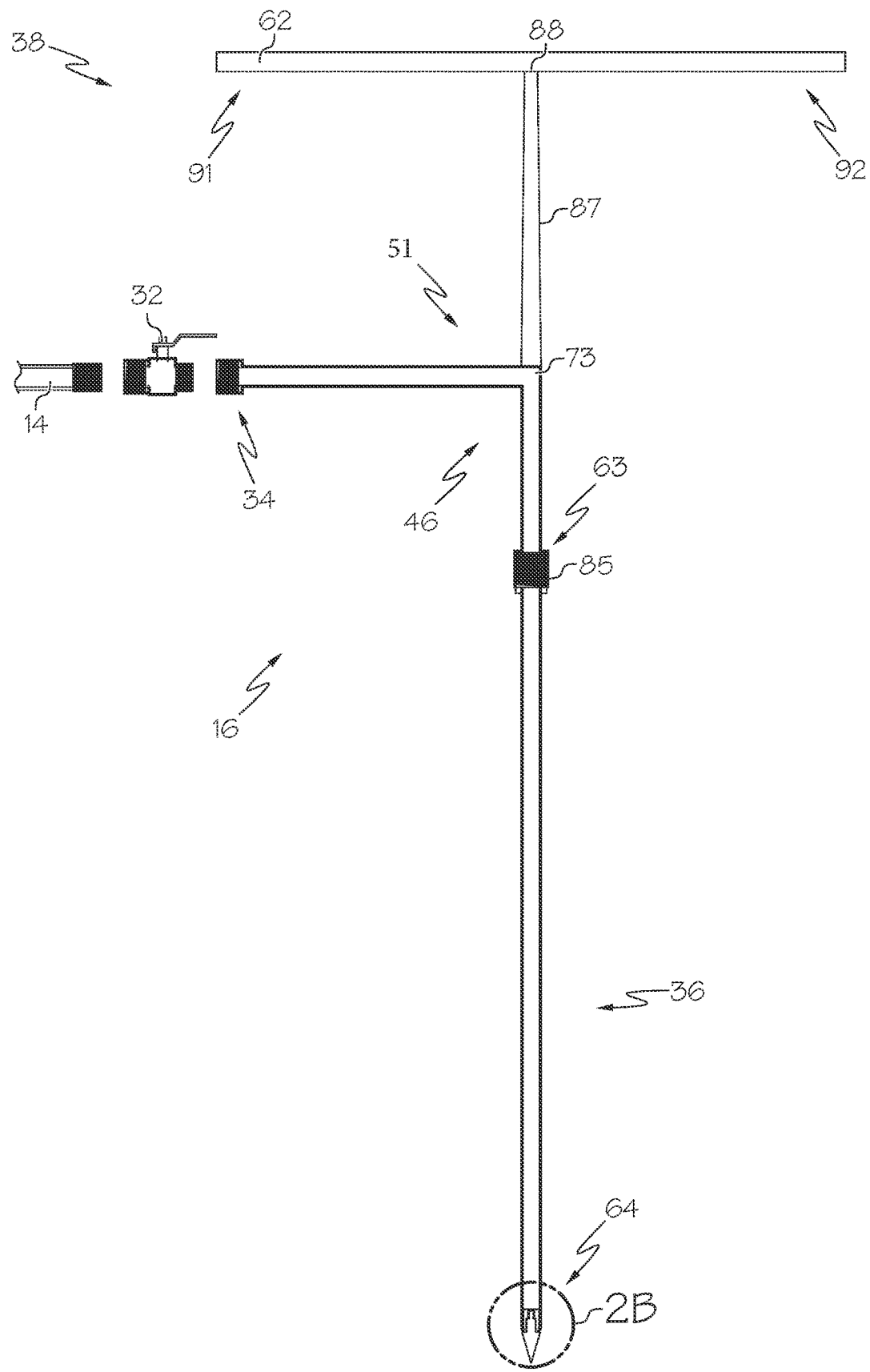
FIG. 2A schematically depicts an application stem configured to be fluidly couple to the system of FIG. 1, according to one or more embodiments shown and described herein.

In embodiments, an application valve 32 may be positioned between the fluid outlet line 14 and the application stem 16. The application valve 32 may be operated by a user to open or close flow through the fluid outlet line 14 to the application stem 16. Referring to FIGS. 1 and 2A, the application valve 32 may be, for example, a ball valve or a gate valve that is removably coupled (e.g., one or more threaded fittings) between the fluid outlet line 14 and the application stem 16. The application valve 32 may be a brass inline ball valve, for example. The application valve 32 may isolate flow of heated fluid to the application stem 16. The application valve 32 may be fluidly coupled between the fluid outlet line 14 and the application stem 16 to isolate flow to the application stem 16 without needing to isolate fluid flow to the fluid-heating assembly 20 and/or the fluid inlet line 13. This may provide a user a more convenient flow isolation capability (e.g., no need to put down the application stem 16 and walk back to the housing 12 and/or the residential hose bib. The application valve 32 may include a handle 35 or other manipulator for controlling valve position between open and closed. In some embodiments, the application valve 32 may be electronically controlled using, for example, one or more buttons. In some embodiments, the application valve 32 may be used to throttle the flow of heated fluid through the system 10 to the application stem 16 to control the amount of fluid entering the ground. That is, in some embodiments, the flow rate of fluid through the system 10 may be adjusted using the application valve 32.

Referring again to FIG. 1, fluid flows through the components of the system 10 until it is applied with the application stem 16. For example, fluid enters the heat exchanger 26 at the fluid inlet port 29 where it is subsequently heated via the heat exchanger 26. The heated fluid exits the heat exchanger 26 and enters the fluid outlet line 14, which delivers fluid to the application stem 16. The application stem 16 will now be described in greater detail.

Figure 2B:
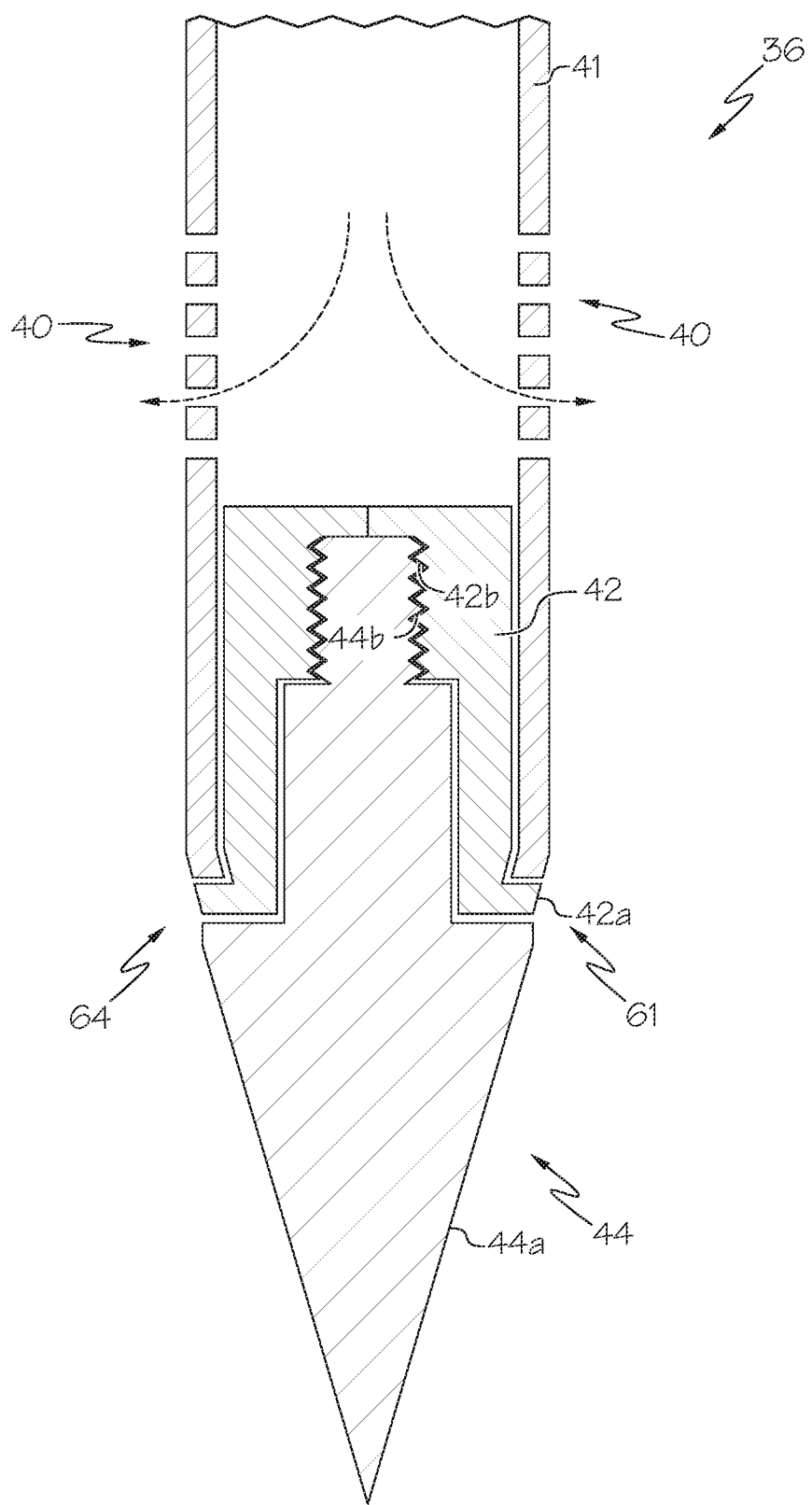
FIG. 2B schematically depicts an end of the application step of FIG. 2A including one or more perforations, a modular tip receiver, and a modular tip, according to one or more embodiments shown and described herein.

FIGS. 2A and 2B show the application stem 16 in greater detail. The application stem 16 receives fluid through a fluid coupling with the fluid outlet line 14 at the application valve 32. As noted above, the application valve 32 may control the flow of fluid from the fluid outlet line 14 to the application stem 16. The application stem 16 may further include a mount 51, a modular hollow shaft 36, a grip 38, a modular tip receiver 42, and a modular tip 44. Various components of the application stem 16 may comprise metallic (e.g., nickel, chrome, etc.) or alloy (e.g., stainless steel) constituents.

The mount 51 may define the application stem inlet 34. The application stem inlet 34 may be connected to the fluid outlet line 14 via the application valve 32, described above. For example, the application stem inlet 34 may have a fluid fitting, such an internally threaded fitting for receiving an externally threaded fitting of the fluid outlet line 14 or the application valve 32. The mount 51 may further define an modular shaft connector 85 which may be removably coupled to the modular hollow shaft 36 and provide fluid communication from the fluid outlet line 14 to the modular hollow shaft 36.

The mount 51 may include a redirection pipe 46 coupled to and extending between the application stem inlet 34 and the modular shaft connector 85. The redirection pipe 46 may include a bend 73, which is shaped to redirect fluid flowing through the mount 51 from a first direction to a second direction and into the modular hollow shaft 36. For example, the second direction may be substantially perpendicular to the first direction. Such redirection may aid in redirecting flow from a substantially horizontal path to the vertical path for injection into the ground, for example.

Coupled to the mount 51 is the grip 38. For example, the grip 38 may be coupled to the mount 51 via welding, soldering, or the like. In some embodiments, the mount 51 and the grip 38 may be integrally formed via casting, for example. In some embodiments, the grip 38 may be mounted to the redirection pipe 46 at the bend 73. The grip 38 may generally extend upwards from the bend 73 so as to be parallel to and aligned with the second direction. The grip 38 may have a t-handle extension. That is, the grip 38 may be generally T-shaped. For example, the t-handle extension may include a central stem 87 and a cross-member 62, wherein the cross-member 62 provides one or more handles to be engaged by a user. The cross-member 62 may be mounted to the central stem 87 at a midpoint 88 of the cross-member 62. Accordingly, the cross-member 62 may provide a first handle 91 and a second handle 92, which allows for even application of force along the modular hollow shaft 36. That is, the user may more easily apply force along the axis of the application stem 16, versus an uneven application of force which may occur if handle did not evenly protrude to either side of the central stem 87. In some embodiments, the cross-member 62 may not be a single member, but may include multiple members mounted to either side of the central stem 87.

As noted above, the application stem 16 may include the modular hollow shaft 36 which may be replaceably connected to the mount 51. The modular hollow shaft 36 may be generally cylindrical and define a first end 63 and a second end 64. The modular hollow shaft 36 may have a high length:diameter ("L:D") aspect ratio. The high L:D aspect ratio may enable easy penetration of the ground (e.g., top soil, dirt, clay, etc.) or, especially, a fire ant mound, for application of the fluid heated by the heat exchanger 26. The L:D ratio of the application stem 16 may be, for example, 20:1, 30:1, 50:1, etc. In embodiments, multiple modular hollow shafts of varying lengths may be provided to be interchanged with one another. That is, a user of the system 10 may select a first modular hollow shaft that is a different length than a second modular shaft, based on the particular application and needs of the user. In some embodiments, a modular shaft may be formed of a plurality of interconnectable portions to allow for adjusting a length of the modular hollow shaft, as desired. In some embodiments, it is contemplated that the modular hollow shaft 36 may be telescoping to increase or decrease a length of the modular hollow shaft 36.

Connection and disconnection between the modular hollow shaft 36 and the mount 51 may, for example, provide a convenient means for attaching shafts of varying lengths or profiles to the application stem 16. In some embodiments, the modular hollow shaft 36 may include a tapered profile such that an outer diameter of the modular hollow shaft 36 decreases in diameter along all or a portion of the length of the modular hollow shaft 36 from the connection with the mount 51 to the modular tip 44. Other profiles are considered and the selection of a particular shaft profile and length may be related to the characteristics of the particular nest or insect that is being targeted with the system 10. For example, if it is determined that a particular nest is two feet beneath a rocky portion of earth, a shaft profile with a length of at least two feet and with features suited for penetrating rocky earth may be selected by a user.

As best depicted in FIG. 2B, formed within the second end 64 of the modular hollow shaft 36 may be one or more perforations 40 formed through a wall 41 of the modular hollow shaft 36. The perforations 40 may generally be holes through an entire thickness of the wall 41 of the modular hollow shaft 36. Heated fluid may pass through the modular hollow shaft 36 to the perforations 40 and into the earth to eradicate pests as indicated by arrows passing through the perforations 40. In some embodiments, the modular hollow shaft 36 may include two or more perforations, four or more perforations, six or more perforations, eight or more perforations, ten perforations or more perforations, etc. In some embodiments, the perforations 40 may comprise a perforations pattern (e.g., may be evenly spaced about a circumference of the shaft). In embodiments, the perforations 40 are positioned above but adjacent the modular tip receiver 42, which may be positioned within the second end 64 of the modular hollow shaft 36.

Still referring to FIG. 2B, the modular tip receiver 42 and the modular tip 44 may be installed in the modular hollow shaft 36 at the second end 64 of the modular hollow shaft 36. The modular hollow shaft 36 includes a modular tip receiver opening 61 at the second end 64 that may encircle, for example, a flange that may be permanently or removably coupled to the modular hollow shaft 36 at the second end 64. For example, the modular tip receiver 42 may be press fit or be threaded into the modular hollow shaft 36 at the second end 64 or may be welded or brazed in place. The modular tip receiver 42 may include a threaded fitting 42b that is configured to receive a threaded fitting 44b of the modular tip 44. The modular tip receiver 42 may provide additional strength, stiffness, or supporting area to the modular hollow shaft 36 and provide a place for attachment of the modular tip 44 as described herein.

Still referring to FIG. 2B, the modular tip 44 may be removably coupled within the modular tip receiver 42. The modular tip 44 may comprise, for example, a threaded fitting 44b that may removably couple with a threaded fitting 42b in the modular tip receiver 42, as noted above. Various embodiments of the modular tip 44 comprise different profiles that may be selectable based on the characteristics of the earth into which the modular tip 44 will be inserted. As depicted in FIGS. 2A and 2B, the modular tip 44 may include a brass point with a generally conical profile, but embodiments are not limited thereto. In some embodiments, the point may comprise copper, nickel, steel, or similar metal or metal alloy.

In some embodiments, one or more of the modular tip receiver 42 and the modular tip 44 have a sloping external profile 42a, 44a. The sloping external profile 42a, 44a may assist with insertion of the modular hollow shaft 36 into the earth.

Referring now to FIGS. 1-3, operation of the system 10 to eradicate pests will be described in greater detail. A user may pull the adjustable handle 54 to move the system 10 to an eradication location. It is contemplated that the system 10 may be easily moved about a residential property without need for motorized vehicles or road access. The system 10 may conveniently moves behind the user because it is supported on the chassis 48 by one or more wheels 50. Thus, an individual user is able to move the system 10 to an ant hill or other pest infestation site without assistance of a vehicle or other means of pulling the system 10.

Once at the application location (i.e., the eradication location), the user may commence the flow of working fluid to the system 10. Generally, the working fluid is water from a civil source (e.g., a county water works, etc.) at ground temperature and between 30-60 psi, but this is not required. It is contemplated that water in the liquid state at various temperatures and pressures can be used within the system 10. If the pressure in the fluid inlet line 13 is too high, the pressure regulating valve 30 may reduce the pressure of the fluid before it enters the heat exchanger 26. Once liquid is flowing through the fluid inlet line 13 and the pressure regulating valve 30 to the heat exchanger 26, the user may light the burners 24 to heat the fluid within the heat exchanger 26. In some embodiments the burners 24 may be lit prior to flowing fluid through the system 10.

As the fluid passes through the sinuous flow path 80 of the heat exchanger 26 it is heated by the burners 24. The fluid may pass over the burners 24 several times through sinuous flow path 80 of the heat exchanger 26 until it is sufficiently heated so that it will eradicate insects upon leaving the application stem 16. The fluid may be heated, for example, to between 180 and 200 degrees F., though other temperatures are contemplated above. In some embodiments, the intensity of the flame on the burners 24 and/or the rate of fuel consumption in the fluid-heating assembly 20 may be adjusted to heat the fluid more quickly or less quickly within the heat exchanger 26 as desired.

Once the fluid within the heat exchanger 26 is at sufficient pressure and temperature, as determined, for example, using the gauge 66, the application stem 16 may be placed into the earth for application of the heated fluid. A user may handle the grip 38 to apply the application stem 16 into the earth, driving the application stem 16 such that it is at a sufficient depth to apply the heated fluid to an insect nest, for example. As noted above, the t-shaped handle helps apply an even force to drive the stem into the ground. The user may then release the heated fluid through the application stem 16 by opening the application valve 32.

Upon opening the application valve 32, heated fluid may flow through the fluid outlet line 14, and the application stem 16 including the modular hollow shaft 36. The heated fluid may then flow through the perforations 40 at the second end 64 of the modular hollow shaft 36 and into the earth. The heated fluid may eradicate insects in the vicinity of the application stem 16. Because components of the system 10 may be replaced, for example, the modular hollow shaft 36, system parts may be replaced individually as they wear or based on a particular insect eradication site. This may enhance the longevity of the system 10 as a whole as well as make it more operationally useful.

Embodiments of the present disclosure can be described with references to the following numerical clauses:

1. A system for exterminating insects includes: a housing; a fluid-heating assembly housed within the housing and including: one or more fuel reserves; one or more burners that receive fuel from the one or more fuel reserves; and a heat exchanger defining a sinuous flow path positioned to receive heat from the one or more burners; a fluid inlet line coupled to the housing and fluidly connectable to a residential hose bib, the fluid inlet line being fluidly coupled to the sinuous flow path of the heat exchanger, such that fluid is directed from the fluid inlet line directly to the sinuous flow path of the heat exchanger; and a fluid outlet line coupled to the housing and fluidly coupled to the sinuous flow path of the heat exchanger such that the fluid is directed from the sinuous flow path of the heat exchanger directly through the fluid outlet line, wherein the fluid within the heat exchanger is heated to an extermination temperature.

2. The system of clause 1, further including an application stem removably coupled to the fluid outlet line, the application stem including: a modular hollow shaft including a first end and a second end and defining one or more perforations adjacent the second end and a modular tip receiver opening formed at the second end; a modular tip receiver positioned within the modular tip receiver opening; and a modular tip removably coupled to the modular tip receiver, wherein the fluid heated within the heat exchanger is supplied with the fluid from the heat exchanger through the fluid outlet line, and the fluid exits the application stem through the one or more perforations.

3. The system of any preceding clause, further including an application valve that controls fluid flow to the application stem.

4. The system of any preceding clause, the application stem further including a grip.

5. The system of any preceding clause, wherein the grip includes a t-handle extension.

6. The system of any preceding clause, wherein the application stem further includes: a redirection pipe to which the modular hollow shaft is removably coupled at the first end of the modular hollow shaft, wherein the redirection pipe is couplable to the fluid outlet line, and the fluid is redirected as it flows through the redirection pipe from a first direction to a second direction substantially perpendicular to the first direction; and a grip including a t-handle extension is mounted to the redirection pipe at a transition between the first direction and the second direction.

7. The system of any preceding clause, wherein the modular hollow shaft includes at least 10 perforations.

8. The system of any preceding clause, wherein the modular tip receiver and the modular tip includes a sloping external profile.

9. The system of any preceding clause, wherein the fluid outlet line is rated to hold water at temperatures between about 190 degrees F. to about 200 degrees F.

10. The system of any preceding clause, wherein the housing includes a one or more sidewalls and a moveable top moveably coupled to the one or more sidewalls.

11. The system of any preceding clause, further including a support cart that includes a chassis and one or more wheels rotatably coupled to the chassis, wherein the housing is mounted to the chassis.

12. The system of any preceding clause, wherein the fluid inlet line includes a pressure regulating valve that regulates a pressure of the fluid flowing through the heat exchanger between about 30 psi to about 60 psi.

13. An application stem for a system for exterminating ants, the application stem including: a modular hollow shaft including a first end and a second end and defining one or more perforations adjacent the second end and modular tip receiver opening formed at the second end; a mount for fluidly coupling the modular hollow shaft to a heat exchanger of the system for exterminating fire ants; a modular tip receiver positioned within the modular tip receiver opening; and a modular tip removably coupled to the modular tip receiver, wherein fluid heated within the heat exchanger is supplied with the fluid from the heat exchanger through a fluid outlet line, and the fluid exits the application stem through the one or more perforations.

14. The application stem of any preceding clause, the application stem further including a grip.

15. The application stem of any preceding clause, wherein the grip includes a t-handle extension.

16. The application stem of any preceding clause, wherein the mount includes: a redirection pipe to which the modular hollow shaft is removably coupled at the first end of the modular hollow shaft, wherein the redirection pipe is couplable to the fluid outlet line, and the fluid is redirected as it flows through the redirection pipe from a first direction to a second direction substantially perpendicular to the first direction; and a grip including a t-handle extension is mounted to the redirection pipe at a transition between the first direction and the second direction.

17. The application stem of any preceding clause, wherein the fluid outlet line is rated to hold water at temperatures between about 190 degrees F. to about 200 degrees F.

18. The application stem of any preceding clause, wherein the modular tip receiver and the modular tip include a sloping external profile.

19. A system for exterminating insects including: a housing mounted to a chassis including one or more wheels that are rotatably coupled to the chassis; a fluid-heating assembly housed within the housing and includes: one or more fuel reserves; one or more burners that receive fuel from the one or more fuel reserves; and a heat exchanger defining a sinuous flow path positioned above the one or more burners to receive heat from the one or more burners; a fluid inlet line coupled to the housing and configured to be directly fluidly coupled to a residential hose bib the fluid inlet line being fluidly coupled to the sinuous flow path of the heat exchanger, such that fluid is directed from the fluid inlet line directly to the sinuous flow path of the heat exchanger; and a fluid outlet line coupled to the housing and fluidly coupled to the sinuous flow path of the heat exchanger such that the fluid is directed from the sinuous flow path of the heat exchanger directly through the fluid outlet line, wherein the fluid within the heat exchanger is heated to an extermination temperature.

20. The system of any preceding clause, further including an application stem removably coupled to the fluid outlet line, the application stem including: a modular hollow shaft including a first end and a second end and defining one or more perforations adjacent the second end and a modular tip receiver opening formed at the second end; a modular tip receiver positioned within the modular tip receiver opening; and a modular tip removably coupled to the modular tip receiver, wherein the fluid heated within the heat exchanger is supplied with the fluid from the heat exchanger through the fluid outlet line, and the fluid exits the application stem through the one or more perforations.

It should now be understood that a system for exterminating insects may include a housing, a fluid-heating assembly housed within the housing and including one or more fuel reserves, one or more burners receiving fuel from the one or more fuel reserves, and a heat exchanger defining a sinuous flow path positioned to receive heat from the one or more burners, a fluid inlet line coupled to the housing and configured to be directly fluidly coupled to a residential hose bib the fluid inlet line being fluidly coupled to the sinuous flow path of the heat exchanger, such that fluid is directed from the fluid inlet line directly to the sinuous flow path of the heat exchanger; and a fluid outlet line coupled to the housing and fluidly coupled to the sinuous flow path of the heat exchanger such that fluid is directed from the sinuous flow path of the heat exchanger directly through the fluid outlet line. Fluid within the heat exchanger may be heated to an extermination temperature. The system may further include an application stem that may be configured to apply the heated fluid through one or more perforations to exterminate insects. The system may be generally usable and transportable by an individual without the need for any external mechanisms or vehicles for moving the system. Thus, the system may solve a long-felt but unmet need for mobile insect eradication systems that are transportable by an individual without need for road access and/or vehicle transport.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for exterminating insects comprising:
a housing;
a fluid-heating assembly housed within the housing and comprising:
one or more fuel reserves;
one or more burners that receive fuel from the one or more fuel reserves; and
a heat exchanger defining a sinuous flow path positioned to receive heat from the one or more burners;
a fluid inlet line coupled to the housing and fluidly connectable to a residential hose bib, the fluid inlet line being fluidly coupled to the sinuous flow path of the heat exchanger, such that fluid is directed from the fluid inlet line directly to the sinuous flow path of the heat exchanger;
a fluid outlet line coupled to the housing and fluidly coupled to the sinuous flow path of the heat exchanger such that the fluid is directed from the sinuous flow path of the heat exchanger directly through the fluid outlet line, wherein the fluid within the heat exchanger is heated to an extermination temperature; and
an application stem removably coupled to the fluid outlet line, the application stem comprising:
a modular hollow shaft comprising a first end and a second end and defining one or more perforations adjacent the second end and a modular tip receiver opening formed at the second end;
a modular tip receiver positioned within the modular tip receiver opening; and
a modular tip removably coupled to the modular tip receiver, wherein the fluid heated within the heat exchanger is supplied through the fluid outlet line, and the fluid exits the application stem through the one or more perforations, wherein the modular tip receiver and the modular tip comprise a sloping external profile.

2. The system of claim 1, further comprising an application valve that controls fluid flow to the application stem.

3. The system of claim 1, the application stem further comprising a grip.

4. The system of claim 3, wherein the grip comprises a t-handle extension.

5. The system of claim 1, wherein the application stem further comprises:
a redirection pipe to which the modular hollow shaft is removably coupled at the first end of the modular hollow shaft, wherein the redirection pipe is couplable to the fluid outlet line, and the fluid is redirected as it flows through the redirection pipe from a first direction to a second direction substantially perpendicular to the first direction; and
a grip comprising a t-handle extension is mounted to the redirection pipe at a transition between the first direction and the second direction.

6. The system of claim 1, wherein the modular hollow shaft comprises at least 10 perforations.

7. The system of claim 1, wherein the fluid outlet line is rated to hold water at temperatures between about 190 degrees F. to about 200 degrees F.

8. The system of claim 1, wherein the housing comprises one or more sidewalls and a moveable top moveably coupled to the one or more sidewalls.

9. The system of claim 1, further comprising a support cart that comprises a chassis and one or more wheels rotatably coupled to the chassis, wherein the housing is mounted to the chassis.

10. The system of claim 1, wherein the fluid inlet line comprises a pressure regulating valve that regulates a pressure of the fluid flowing through the heat exchanger between about 30 psi to about 60 psi.

11. A system for exterminating insects comprising:
a housing mounted to a chassis including one or more wheels that are rotatably coupled to the chassis;
a fluid-heating assembly housed within the housing and comprising:
one or more fuel reserves;
one or more burners that receive fuel from the one or more fuel reserves; and
a heat exchanger defining a sinuous flow path positioned above the one or more burners to receive heat from the one or more burners;
a fluid inlet line coupled to the housing and configured to be directly fluidly coupled to a residential hose bib, the fluid inlet line being fluidly coupled to the sinuous flow path of the heat exchanger, such that fluid is directed from the fluid inlet line directly to the sinuous flow path of the heat exchanger;
a fluid outlet line coupled to the housing and fluidly coupled to the sinuous flow path of the heat exchanger such that the fluid is directed from the sinuous flow path of the heat exchanger directly through the fluid outlet line, wherein the fluid within the heat exchanger is heated to an extermination temperature; and
an application stem removably coupled to the fluid outlet line, the application stem comprising:
a modular hollow shaft comprising a first end and a second end and defining one or more perforations adjacent the second end and a modular tip receiver opening formed at the second end;
a modular tip receiver positioned within the modular tip receiver opening; and
a modular tip removably coupled to the modular tip receiver, wherein the fluid heated within the heat exchanger is supplied through the fluid outlet line, and the fluid exits the application stem through the one or more perforations, wherein the modular tip receiver and the modular tip comprise a sloping external profile.

* * * * *